No. 657,855. Patented Sept. 11, 1900.
C. J. COLEMAN.
FRICTIONAL DRIVING GEAR.
(Application filed Jan. 12, 1900.)

(No Model.)

Attest:
John Enders Jr.
M. H. Holmes.

Inventor:
Clyde J. Coleman,
By Robert Burns
Attorney.

UNITED STATES PATENT OFFICE.

CLYDE J. COLEMAN, OF CHICAGO, ILLINOIS, ASSIGNOR TO THOMAS J. RYAN, OF NEW YORK, N. Y.

FRICTIONAL DRIVING-GEAR.

SPECIFICATION forming part of Letters Patent No. 657,855, dated September 11, 1900.

Application filed January 12, 1900. Serial No. 1,198. (No model.)

*To all whom it may concern:*

Be it known that I, CLYDE J. COLEMAN, a citizen of the United States of America, and a resident of Chicago, in the county of Cook and State of Illinois, have invented certain new and useful Improvements in Frictional Driving-Gear, of which the following is a specification.

The present invention relates to a frictional driving device applicable to a variable-speed mechanism, more especially adapted for electrically-propelled vehicles in connection with the motor-current-controlling mechanism thereof, an example of which constitutes the subject-matter of my prior application for Letters Patent, Serial No. 734,970, for motor-vehicles, filed October 29, 1899.

The object of the present invention is to provide a simple and efficient intermediate connection between a pair of variable-speed pulleys in which the usual lateral straining, undue slipping, and uneven wear of the contact-surfaces usual to the ordinary type of variable-speed pulleys is reduced to a minimum and a very efficient transmission of power effected, all as will hereinafter more fully appear and be more particularly pointed out in the claims. I attain such object by the construction of parts illustrated in the accompanying drawings, in which—

Figure 1:
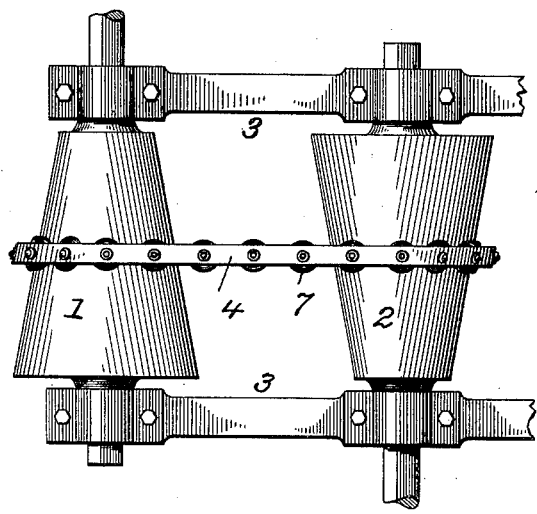
Figure 2:
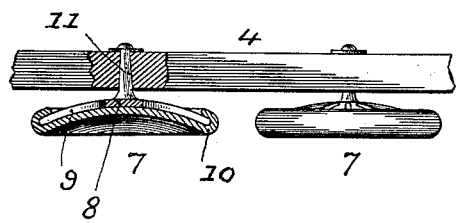
Figure 3:
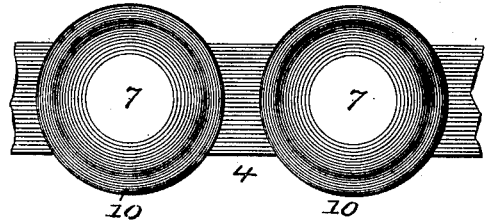
Figure 4:
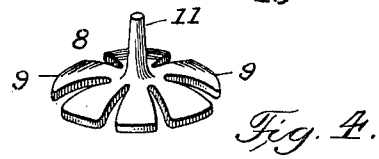
Figure 5:
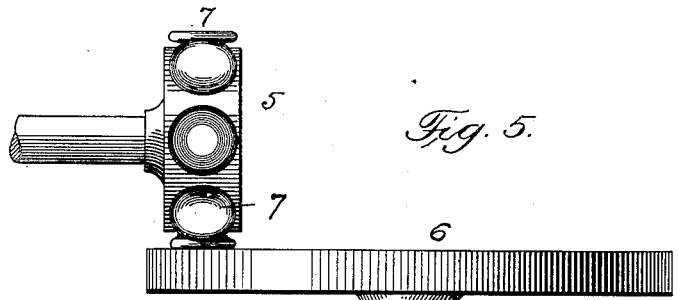

Figure 1 is a plan view of a cone-pulley power-transmitting mechanism embodying the present invention; Fig. 2, an enlarged fragmentary side elevation, partly in section, of a belt to which the present invention is applied; Fig. 3, a similar plan view of the same; Fig. 4, a perspective view of the supporting spider or core of the contact-pads of the present invention; Fig. 5, a detail plan view of a friction disk and wheel to which the present invention is applied.

Similar numerals of reference indicate like parts in the several views.

The present invention is applicable to any usual type of variable-speed mechanism in which a frictional surface contact between the driving and driven member of the mechanism is employed to transmit the power.

In the construction shown in Fig. 1 as illustrative of the present invention, 1 and 2 are a pair of reversely-arranged cone-pulleys journaled in a supporting-frame 3 and connected together by a shiftable belt 4, which is capable of the usual shifting movement by any usual and well-known shifting means to increase or decrease the speed of the driven pulley of the variable-speed mechanism.

In the construction shown in Fig. 5 of the drawings as illustrative of the present invention, 5 is a friction driving-pinion, and 6 a driven wheel or disk, both of any usual or well-known construction and arrangement.

The present invention involves the provision, on the contact-surface of the transmitting-belt 4, of cone-pulleys, illustrated in Fig. 1, or on that of the driving-pinion 5 of the variable-speed mechanism illustrated in Fig. 5, of a series of intermediate bearing pads or shoes 7. Each of said pads or shoes 7 will be preferably formed of a cup shape, as shown, and will comprise an inner supporting-spider 8, of metal, the radial prongs 9 of which are elastic to afford a better contact of the pad in use, and an outer covering or facing 10, of leather or other like material, as shown. The pads or shoes 7 may be secured in any usual manner to the belt 4 or to the friction-disk 5, preferably, however, by means of attaching-shanks 11, formed integral with the supporting-spider, as illustrated in Figs. 2 and 4.

Having thus fully described my said invention, what I claim as new, and desire to secure by Letters Patent, is—

1. In a frictional driving-gear, the combination of a driven and driving member, and a series of intermediate bearing shoes or pads carried by the driving member, and attached thereto by a central stud, so as to be capable of independent movement, substantially as set forth.

2. In a frictional driving-gear, the combination of a driven and a driving member, of a series of cup-shaped intermediate bearing shoes or pads carried by the driving member, substantially as set forth.

3. In a frictional driving-gear, the combination of a driven and driving member, and a series of intermediate bearing shoes or pads carried by the driving member, each pad comprising an inner supporting-spider provided with elastic prongs and an outer covering or facing, substantially as set forth.

4. In a frictional driving-gear, the combination of a driven and driving member, and a series of intermediate bearing shoes or pads carried by the driving member, each pad comprising an inner supporting-spider provided with elastic prongs, an integral attaching-shank and an outer covering or facing, substantially as set forth.

Signed by me at New York, N. Y., this 10th day of January, 1900.

CLYDE J. COLEMAN.

Witnesses:
ROBERT BURNS,
M. H. HOLMES.